United States Patent [19]

Kay

[11] 3,844,161
[45] Oct. 29, 1974

[54] FLUIDIC PROXIMITY SENSING DEVICES

[75] Inventor: Francis Xavier Kay, Winslow, England

[73] Assignee: Instruments and Movements Limited, London, England

[22] Filed: June 21, 1972

[21] Appl. No.: 264,943

[30] Foreign Application Priority Data
June 22, 1971  Great Britain .................... 29237/71

[52] U.S. Cl. .............................................. 73/37.5
[51] Int. Cl. .......................................... G01b 13/12
[58] Field of Search ............ 73/37.5; 137/804, 805, 137/833, 81.5

[56] References Cited
UNITED STATES PATENTS
3,246,507  4/1966  Hyde................................... 73/37.5
3,470,733  10/1969  Rule et al. .......................... 73/37.5

Primary Examiner—Donald O. Woodiel
Attorney, Agent, or Firm—Parmelee, Miller, Welsh & Kratz

[57] ABSTRACT

A fluidics proximity sensing device comprises a transmitter for directing a pressure fluid jet to impinge upon an object to be sensed, and a receiver including a receiver orifice leading to a receiver passage in which fluid moves in response to the pressure at said orifice, a sensing fluid passage intersecting said receiver passage so that a sensing fluid flowing in the sensing fluid passage traverses the receiver passage and is thus disturbed by fluid movement in the latter. By appropriate choice of passage dimensions and fluid pressures the device may be adapted to provide long-range sensing of objects, an output signal that is an analogue of the distance of a sensed object from the device, or an output signal that changes substantially in response to small changes in the proximity of a sensed object.

10 Claims, 6 Drawing Figures

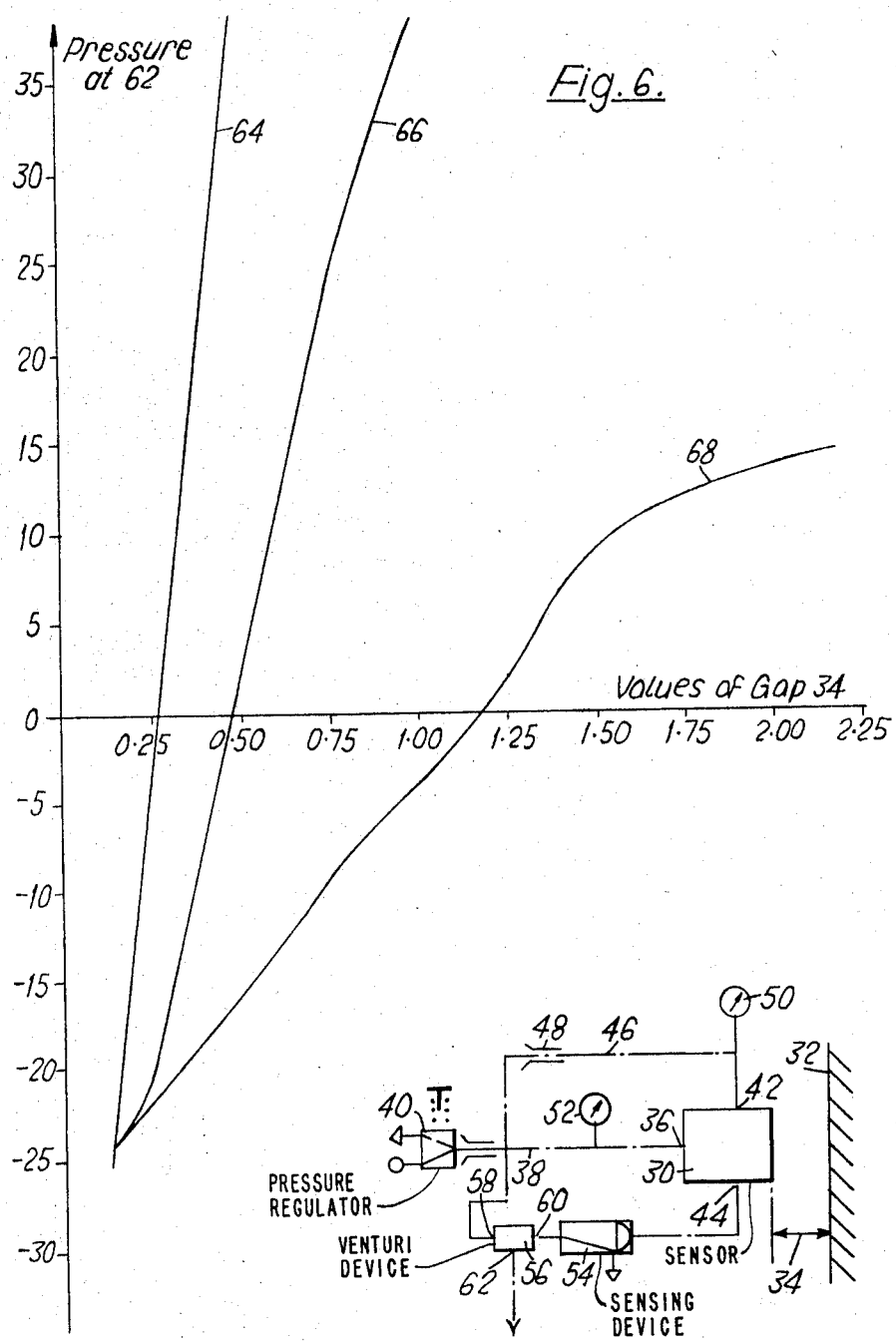

FLUIDIC PROXIMITY SENSING DEVICES

BACKGROUND TO INVENTION

The invention concerns fluidic proximity sensing devices which are used for non-contact sensing of the presence of objects in a specified location, or for determining the distance of an object from such a location.

In general, a fluidic proximity sensing device comprises a transmitter adapted to direct one or more jets of pressure fluid, e.g., compressed air, in the path of an object to be sensed by the device, and a receiver adapted to respond to the change in fluid pressure conditions produced at the receiver as a result of impingement of the jet or jets from the transmitter upon the object to be sensed. Usually, the transmitter and receiver are formed as a single unit and in order to achieve adequate sensitivity it has hitherto been thought necessary to use a symmetrical arrangement in which the transmitter directs a tubular or convergent conical stream of pressure fluid co-axially with respect to a receiver orifice. The tubular or convergent conical stream may be produced by a single annular orifice or a ring of jets encircling the receiver orifice.

In spite of this rather complex arrangement, nevertheless the performance of a device of this general form leaves much to be desired and, moreover, such devices have a response characteristic (plot of receiver response against distance of sensed object) that is distinctly irregular and which usually has an anomalous "kink" - the receiver response being abnormal (usually substantially reduced) for an object at a particular distance as compared with its response when the object is both slightly closer to and slightly further away from the device than at particular distance at which the anomalous response occurs.

It has now been found that, surprisingly, the performance of such a device may be remarkably improved by an expedient that enables much of the complexity of the transmitter arrangements of known devices to be avoided.

BRIEF DESCRIPTION OF THE INVENTION

In its broadest aspect, the invention provides a fluidic proximity sensing device comprising transmitter means for projecting a pressure fluid jet in a predetermined direction and near to a receiver orifice, said receiver orifice communicating with a receiver passage which intersects a sensing fluid passage through which a sensing fluid is caused to flow in a stream that traverse said receiver passage.

It is found that in such a device, the sensing fluid stream is markedly affected by fluid pressure conditions within said receiver passage and that the change in pressure or flow conditions in the receiver passage resulting from disturbance of the pressure pattern at the receiver orifice due to proximity of an object will produce a substantial change in the flow of sensing fluid in the sensing fluid passage downstream of its intersection with the receiver passage. Moreover, by appropriate selection of passage dimensions, fluid pressures and flow rates, both for the transmitter jet and for the sensing fluid, the performance of the device may be varied to suit particular applications: for instance the device may be constructed and operated in a manner to be capable of reliably detecting the presence of an object at a considerably greater distance from the device than has previously been possible (distance sensitivity); or the device may be constructed and operated in a manner to provide a well-defined response to an object at a particular location; or it may be constructed and operated so that the response of the sensing fluid stream bears a simple relationship to the distance of the object from the device so that the latter may be utilized not only to detect the presence of the object but also to signal its distance from the device.

However, and as will be explained, the construction and operating conditions suitable for producing a distance-connected response are ordinarily different from those giving the greatest distance sensitivity or discrimination between objects at and near, respectively, a particular location although, generally, a distance-connected response will be obtainable with a greater distance sensitivity than that normally available with known devices.

The said receiver passage is preferably a straight tubular passage one end of which constitutes the receiver orifice and the other end of which is open so that the pressure pattern at the orifice modulates a flow of fluid e.g. atmospheric air in the usual case, through this passage. However; surprisingly, the receiver passage may be "blind"; that is, closed at its end remote from the receiver orifice and in such case may either be unvented or have a lateral vent. For manufacturing simplicity, it will usually be convenient to employ an open-ended receiver passage formed, for instance, as a through-bore in a block of suitable material that is formed also with the sensing fluid passage and one or more transmitter jet passages.

The sensing fluid passage is preferably of smaller cross-section than the receiver passage, these two passages having their axes intersecting one another, preferably at right angles. For maximum linearity of response it will ordinarily be desirable to operate with the transmitter fluid and the sensing fluid both at a relatively high pressure, the sensing fluid passage being of sufficient length on each side of its intersection with the receiver passage as to provide for substantially laminar flow of the sensing fluid in the region where it traverses the receiver passage. With such an arrangement, small disturbances of the flow or pressure pattern in the receiver passage will produce extensive changes in the flow of sensing fluid in the sensing fluid passage downstream of its intersection with the receiver passage. At lower sensing fluid pressures, the linearity and discriminatory sensitivity will be reduced but distance sensitivity will be enhanced.

Thus, with a relatively low pressure, low velocity, flow of sensing fluid in a sensing fluid passage dimensioned to give turbulant flow conditions in the stream where it traverses the receiver passage, the flow of sensing fluid in the sensing fluid passage downstream of its intersection with the receiver passage will vary more or less proportionately to the flow of fluid in the receiver passage and if this latter flow is made to follow the distance of a sensed object from the receiver orifice, as will ordinarily occur with an open-ended receiver passage or with a "blind" but vented receiver passage, the flow of sensing fluid will be related to the distance of a sensed object from the receiver orifice: that is the response will be distance-connected.

Whilst the transmitter means may take the form that has hitherto become widely used in the art and which comprises an annular orifice or a ring of orifices adapted to project a so-called "focused jet" that is effectively a tubular or convergent conical stream of pressure fluid co-axially of the receiver orifice, it has been found that such a complex transmitter arrangement is unnecessary to achieve good sensitivity in a device in accordance with the invention and that more simple transmitter means may be employed without significant loss of sensitivity. Indeed in some circumstances it may be found that a simplified transmitter means in a device in accordance with the invention gives the device better sensitivity than the use in that device of the more complex transmitter means hitherto thought to be necessary.

Thus, preferably, the transmitter means in a device in accordance with the invention comprise a simple jet-producing nozzle adapted to direct a stream of pressure fluid along a path close to and approximately parallel with the extended axis of the receiver orifice; that is to say, approximately parallel with the central normal to the receiver orifice and which coincides with the extended axis of the receiver passage in the usual case.

In typical embodiments of the invention the transmitter means comprise a straight transmitter passage extending alongside the receiver passage parallel therewith and terminating in an orifice or nozzle adjacent to the receiver orifice. Whilst usually it will be convenient, for manufacturing reasons, for the transmitter and receiver passages in such embodiments to be accurately parallel with one another, the axes of these passages may be as much as 10° out of parallel without significant effect upon the performance of the device. Thus although it might be expected that with the transmitter passage axis so relatively inclined to the axis of the receiver passage that the jet produced by the transmitter means converges upon the extended axis of the receiver passage, the sensitivity of the device would not be less and might be greater than in the case of parallel passages, it has been found that in fact the axis of the projected jet may diverge from the extended axis of the receiver passage without significant loss of sensitivity.

It has been found that when a device in the form indicated above, having parallel transmitter and receiver passages is used with low working fluid pressure to provide for the detection of objects at relatively short distances from the receiver orifice, improved sensitivity and reliable differentiation between the presence and absence of an object is obtained if the receiver orifice is formed with a lateral recess that surrounds a nozzle at the end of the transmitter passage, the nozzle and the receiver orifice otherwise terminating in the same plane.

Devices in accordance with the invention and utilizing air as the working fluid may operate satisfactorily to detect the presence of objects at relatively short distances from the receiver orifice - that is to say distances of a few tenths of an inch or millimeters - with working fluid pressures of the order of 1–2 inches (25–50 mm.) water gauge. For the detection of objects at greater distances higher working fluid pressures are desirably employed, preferably with both the transmitter means and the sensing fluid passages so arranged as to give substantially laminar flow of the working fluid at the base of the jet produced by the transmitter means and in the sensing fluid where it traverses the receiver passage. By such expedient, the detection of objects up to a distance of 2 inches (50 mm.) or more may be reliably achieved with a signal, i.e. sensing fluid flow rate or pressure in the sensing fluid passage downstream of its intersection with receiver passage, that is an analogue of the distance of the detected object from the receiver orifice.

However for maximum distance sensitivity and for the reliable detection of objects at the greatest distances it appears to be advantageous to use transmitter means producing a pulsed jet of working fluid, a transmitter means producing a train of pulses at a repetition rate of about 1000 per second having been found to give particularly advantageous results in our experiments. Alternatively or in addition, the sensing fluid flow may be "pulsed" to enhance distance sensitivity.

THE DRAWINGS AND DESCRIPTION OF EMBODIMENTS OF THE INVENTION

The invention will be further explained and described with reference to the accompanying drawings, in which:

FIG. 6 illustrates typical response characteristics for a device constructed as illustrated in FIGS. 2 to 5 for different operating conditions and the circuitry by which such response characteristics were measured.

Figure 1:
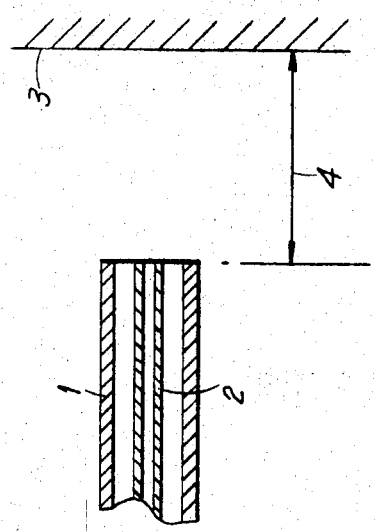
FIG. 1 illustrates, for comparative purposes, the response characteristic of a typical prior art fluidic proximity sensing device the form of which is diagrammatically illustrated in fragmentary axial section.
Figure 1:
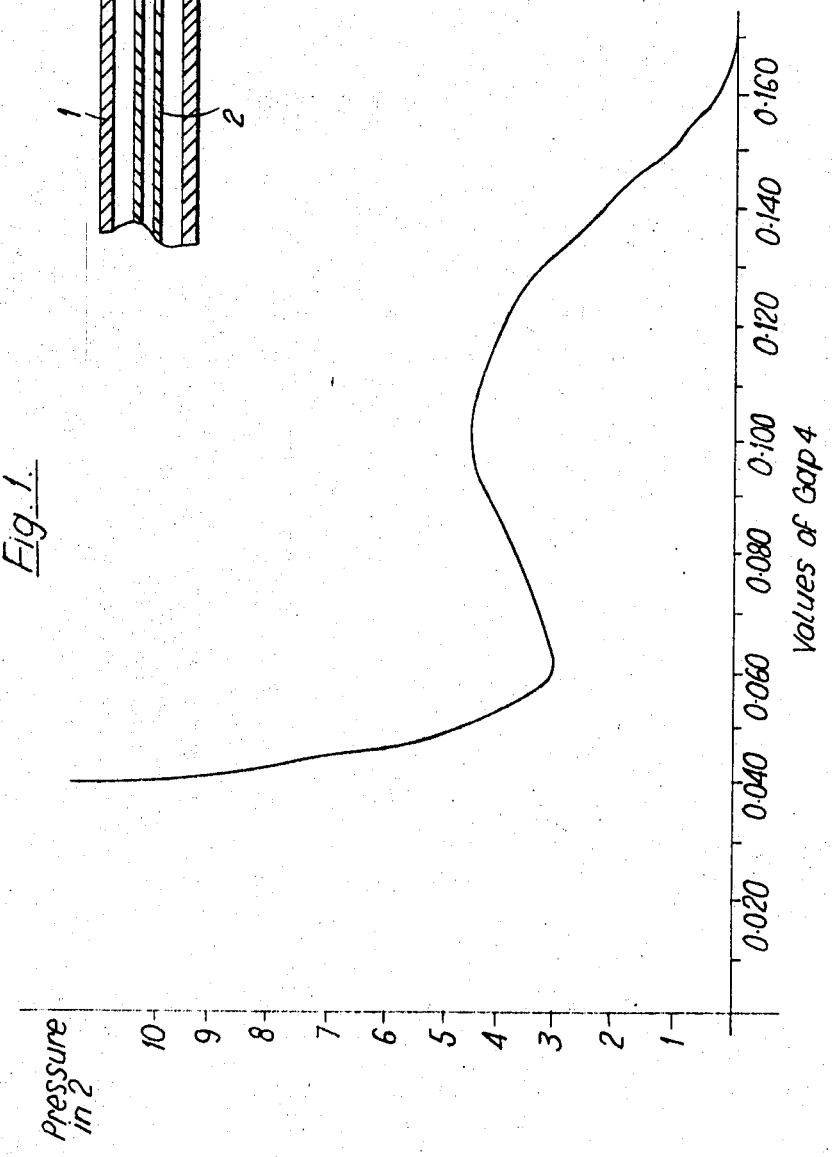

Referring to the drawings, FIG. 1 illustrates a fairly typical response characteristic of a prior fluidic proximity sensing device having the form diagrammatically indicated in this Figure of the drawings. This device comprises, in its essentials, two coaxial tubes 1, 2, respectively, the tube 2 defining a receiver passage and having in this instance an internal diameter of 0.032 inch (0.81 mm.) and an external diameter of 0.062 inch (1.57 mm.). The outer tube 1 has an internal diameter of 0.093 inch (2.36 mm.). The tubes 1 and 2 terminate in the same plane at the righthand end of the device as illustrated in the drawing and for the purposes of measuring the response characteristic, the device was held in suitable rig (not shown) so that the tubes 1 and 2 were disposed accurately perpendicular to a plane surface 3 of substantial extent and at a variable gap distance indicated at 4. Compressed air at a regulated pressure of 6 psig (310 mm. Hg) was supplied to the device so as to flow down the space between tubes 1 and 2 and issue as an annular-section jet from the righthand end of the tube, as shown in the drawing, to impinge upon the surface 3. The pressure pattern at the righthand end of tube 2 owing to impingement of the jet on the surface 3 produces a pressure in the tube 2 and this pressure was measured for different values of the gap distance 4.

The curve shown in the graph of FIG. 1 is a plot of the measured pressure in tube 2 against the value of the gap distance 4 under the conditions explained above.

The very non-linear shape of this curve is manifest. The values for the measured pressure in tube 2 are expressed in inches of water column and the gap distances 4 are expressed in inches on the respective scales. It will be seen that as the distance 4 increases to a value of about 0.060 inch (1.5 mm.) the pressure in the tube 2 falls rapidly to a value of about 3 inches $H_2O$ (5.6 mm.Hg) but then slowly rises to nearly 5 inches $H_2O$ (9.3 mm. Hg) as the gap distance 4 increases from about 0.060 inches (1.5 mm.) to a value of about 0.100 inch (2.5 mm.). Thereafter further increase in the value of the gap distance 4 produces a gradual fall in the pressure in tube 2 until at a gap distance 4 of about 0.130 inch (3.3 mm.) the pressure in tube 2 has once more fallen to about 3 inches $H_2O$ (5.6 mm. Hg).

Thus for a substantial range of values of the gap distance 4, the response of the prior art device illustrated in FIG. 1 is both anomalous and ambiguous in its indication of the value of the gap distance 4 in that a given pressure may represent two different values of gap distance.

Figure 2:
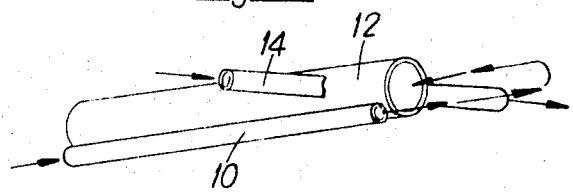
FIG. 2 is a schematic illustration of the preferred layout of the various passages of a fluidic proximity sensing device embodying the invention.
Figure 3:
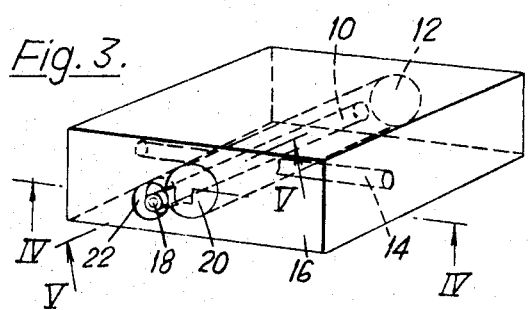
FIG. 3 illustrates the disposition of the passages of FIG. 2 as formed by drillings in a single block.
Figure 4:
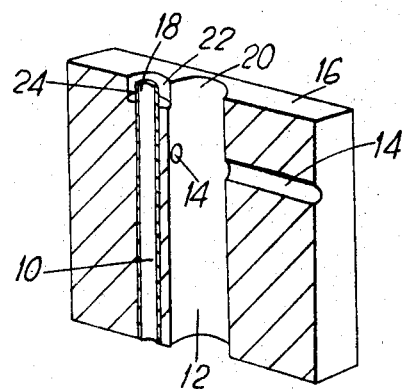
FIG. 4 is a section on line IV—IV of FIG. 3.
Figure 5:
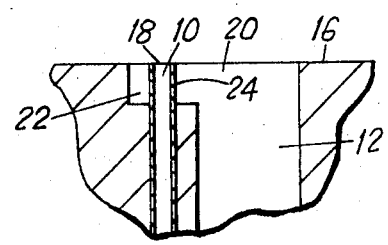
FIG. 5 is a fragmentary section on line V—V of FIG. 3.

FIG. 2 to 5 illustrate a typical embodiment of a fluidic proximity sensing device in accordance with the invention. FIG. 2 shows schematically the layout of passages in the device and which, as shown in FIGS. 3 to 5, are for convenience formed with one exception, as drillings in a solid material block the external shape of which is only shown as being a rectangular prism for the purpose of illustration.

Thus the device of FIGS. 2 to 5 comprises a transmitter passage 10 constituted by a capillary tube disposed in a bore parallel with and closely adjacent to a receiver passage 12 which is intersected by a sensing fluid passage 14. The transmitter pssage 10 may, for instance, have a diameter of 0.040 inch (1 mm.) whilst the receiver passage 12 is of substantially larger diameter for instance 0.313 inch (8 mm.); the passage 14 intercepts the passage 12 at right angles and symmetrically so that its axis intersects that of the passage 12. The passage 14 may for instance have a diameter of 0.015 inch (0.38 mm.) on one side of the passage 12 and a diameter of 0.020 inch (0.51 mm.) on the other side of the passage 12 when the latter has the diameter indicated.

The transmitter passage 10 and the receiver passage 12 terminate in a common plane as best seen in FIG. 4 and 5 where this common plane as best seen in FIG. 4 and 5 where this common plane is represented by the block surface 16. In this plane, the transmitter passage 10 terminates as a plane circular orifice 18 while the receiver passage 12 terminates in a receiver orifice 20 that includes a lateral recess 22 surrounding a nozzle 24 constituted by the extremity of the said tube defining transmitter passage 10. The recess 22 may, for instance, be formed by a counterbore coaxial with the passage 10, having a depth of 0.0625 inch (1.6 mm.) and a diameter sufficient just to break into the receiver orifice 20, e.g. 0.125 inch (3.2 mm.).

The device of FIGS. 2 to 5 is conveniently utilized in a circuit arrangement as schematically illustrated in FIG. 6 which also shows curves illustrating the response characteristic of the device under different operating conditions.

Thus referring first to the schematic circuit diagram of FIG. 6, a device of the form illustrated in FIGS. 2 to 5 is represented by the block 30, orientated so that the orifices 18, 20 (not shown in FIG. 6) are at the right-hand side, facing a plane surface indicated at 32 and separated from the latter by a gap distance 34.

The transmitter passage 10 has a supply port 36 connected by a line 38 to a pressure regulator 40 which provides a suitable supply of compressed air at a chosen pressure: in experiments to determine the response characteristics shown in FIG. 6, the supply pressure provided at port 36 by regulator 40 was about 7 psig (362 mm. Hg).

The sensing fluid passage 14 has inlet and outlet ports shown at 42, 44 respectively in FIG. 6; the port 42, which communicates with the smaller diameter portion of the passage 14, is connected to the output of regulator 40 by a line 46, which includes a variable restriction 48 for setting the pressure at port 42 to a value less than that at port 36. Pressure gauges 50, 52 are connected to the lines 38, 46, respectively to facilitate adjustment of the regulator 40 and restriction 48.

In the arrangement shown, the outlet port 44 communicating with the larger diameter portion of the passage 14 and at which the pressure increases with increasing values of the gap distance 34 within the working range of the device, is connected to a fluidic amplifier which comprises a sensing device 54 of the construction disclosed in U.K. Patent Specification No. 1,269,208 and a venturi device 56. The latter has a venturi passage (not shown) terminated by inlet and outlet ports 58, 60, respectively and a throat tapping connected to a signal port 62. The inlet port 58 is connected to the output of regulator 40 and depending upon the impedance offered by device 54 to flow from the outlet port 60, the pressure at the signal port 62 will vary. The impedance offered by the device 54 will in turn depend upon the pressure at port 44 applied to the device 54, as explained in siaid Specification.

The curves of FIG. 6 are plots of the pressure at signal port 62 (in inches of water column relative to zero gauge pressure) against the gap distance 34 for different values of the sensing fluid pressure at port 42 of the device. Thus the curves marked 64, 66 and 68 are respectively plots of signal port 62 pressures against gap distance 34 for sensing fluid inlet pressures, at port 42, of 8 inches $H_2O$ (15 mm. Hg), 5 inches $H_2O$ (9.3 mm. Hg) and 3 inches $H_2O$ (5.6 mm. Hg).

It will be apparent that with the two higher sensing fluid pressures at the port 42 of the device the response characteristic is substantially linear and the device is highly sensitive to variations of the gap distance 34 within a narrow range of values, the sensitivity being greater at the higher of the two pressures: thus at these higher pressures, the device provides a well-defined response to an object at a particular location. On the other hand, at the lower sensing fluid pressure represented by the curve 68, the sensitivity of the device to variations in gap distance 34 is lower and the response is not so linear: however, the device has substantially greater distance sensitivity, responding to the presence of an object at a substantial distance and producing, moreover, a distance-connected response that is unambiguous.

I claim:

1. A fluidic device for sensing proximity to an object, comprising:

a. receiver means comprising
      a receiver passage,
      a receiver orifice in communication with the receiver passage such that changes in pressure at the receiver orifice induce corresponding pressure changes in the receiver passage, and a sensing fluid passage, intersecting the receiver passage in a manner which divides the sensing fluid pasage into an upstream limb and a downstream limb which limbs are aligned in the sense that the respective openings into the receiver passage face one another so that in the absence of any pressure changes in the receiver passage induced by pressure changes at the receiver orifice sensing fluid flowing out of the upstream limb traverses the receiver passage to impinge directly on the opening of the downstream limb; and b. transmitter means, proximate the receiver orifice adapted for projecting a pressure fluid jet in a predetermined direction toward the object, which pressure fluid jet is deflected by the object and produces a pressure change at the receiver orifice, and a corresponding pressure change in the receiver passage, so as to disturb the flow of the sensing fluid stream traversing the receiving passage.

2. The device of claim 1, in which said receiver passage is a straight tubular passage one end of which constitutes the receiver orifice and the other end of which is open so that the pressure pattern at the orifice modulates a flow of fluid through the receiver passage.

3. The device of claim 1, in which said receiver passage is closed at its end remote from the receiver orifice.

4. The device of claim 1, in which said receiver passage is formed in a block formed also with the sensing fluid passage and at least one transmitter jet passage.

5. The device of claim 1, in which said sensing fluid passage is of smaller cross-section than the said receiver passage, these two passages having their axes intersecting one another at right angles.

6. The device of claim 5, in which said sensing fluid passage is of sufficient length on each side of its intersection with the receiver passage as to provide for substantially laminar flow of the sensing fluid in the region where it traverses the receiver passage.

7. The device of claim 5, in which said sensing fluid passage is dimensioned to give turbulent flow conditions in a sensing fluid stream of low pressure traversing the said receiver passage.

8. The device of claim 1, in which said transmitter means comprise a jet-producing nozzle adapted to direct a stream of pressure fluid along a path close to and approximately parallel with the extended axis of the said receiver orifice.

9. The device of claim 8, in which said transmitter means comprise a straight transmitter passage extending alongside the said receiver passage parallel therewith and terminating in said jet-producing nozzle adjacent to the said receiver orifice.

10. The device of claim 9, in which said receiver orifice has a lateral recess surrounding said jet-producing nozzle which nozzle and the receiver orifice terminate in a common plane.

* * * * *